US012166283B2

(12) United States Patent
Brobston et al.

(10) Patent No.: US 12,166,283 B2
(45) Date of Patent: Dec. 10, 2024

(54) MULTI-BAND BASE STATION ANTENNAS HAVING INTERLEAVED ARRAYS

(71) Applicant: Outdoor Wireless Networks LLC, Claremont, NC (US)

(72) Inventors: Michael Brobston, Allen, TX (US); Jonathon C. Veihl, New Lenox, IL (US)

(73) Assignee: Outdoor Wireless Networks LLC, Claremont, NC (US)

(*) Notice: Subject to any disclaimer, the term of this patent is extended or adjusted under 35 U.S.C. 154(b) by 671 days.

(21) Appl. No.: 17/284,846

(22) PCT Filed: Jan. 28, 2020

(86) PCT No.: PCT/US2020/015288

§ 371 (c)(1),
(2) Date: Apr. 13, 2021

(87) PCT Pub. No.: WO2020/159902

PCT Pub. Date: Aug. 6, 2020

(65) Prior Publication Data

US 2021/0391655 A1 Dec. 16, 2021

Related U.S. Application Data

(60) Provisional application No. 62/800,133, filed on Feb. 1, 2019.

(51) Int. Cl.
*H01Q 21/06* (2006.01)
*H01Q 1/24* (2006.01)
(Continued)

(52) U.S. Cl.
CPC ........... *H01Q 21/062* (2013.01); *H01Q 1/246* (2013.01); *H01Q 5/42* (2015.01); *H01Q 21/28* (2013.01)

(58) Field of Classification Search
CPC .......... H01Q 21/28; H01Q 1/246; H01Q 5/42; H01Q 21/062
See application file for complete search history.

(56) References Cited

U.S. PATENT DOCUMENTS 6,211,841 B1 4/2001 Smith et al.
6,583,760 B2 * 6/2003 Martek .................... H01Q 5/42
343/820

(Continued)

FOREIGN PATENT DOCUMENTS

CN 110858679 A 3/2020
EP 0962033 A1 12/1999

(Continued)

OTHER PUBLICATIONS

Extended European Search Report corresponding to European Application No. 20748874.3 (9 pages) (Jun. 29, 2022).

(Continued)

*Primary Examiner* — Graham P Smith
(74) *Attorney, Agent, or Firm* — Myers Bigel, P.A.

(57) ABSTRACT

Base station antennas are provided herein. A base station antenna includes one or more vertical columns of low-band radiating elements configured to transmit RF signals in a first frequency band. The base station antenna also includes a plurality of vertical columns of high-band radiating elements configured to transmit RF signals in a second frequency band that is higher than the first frequency band. The vertical columns of high-band radiating elements extend in parallel with the one or more vertical columns of low-band radiating elements in a vertical direction.

18 Claims, 12 Drawing Sheets

(51) Int. Cl.
*H01Q 5/42* (2015.01)
*H01Q 21/28* (2006.01)

(56) References Cited

U.S. PATENT DOCUMENTS

| | | | |
|---|---|---|---|
| 2009/0135078 | A1 | 5/2009 | Lindmark et al. |
| 2011/0156986 | A1 | 6/2011 | Baliarda et al. |
| 2014/0111396 | A1 | 4/2014 | Hyjazie et al. |
| 2017/0310009 | A1 | 10/2017 | Isik et al. |
| 2018/0145424 | A1 | 5/2018 | Puente Baliarda et al. |
| 2018/0301801 | A1 | 10/2018 | Hojjat et al. |
| 2018/0337443 | A1 | 11/2018 | Bisiules et al. |

FOREIGN PATENT DOCUMENTS

| | | | |
|---|---|---|---|
| WO | 2017165512 | A1 | 9/2017 |
| WO | 2019052633 | A1 | 3/2019 |

OTHER PUBLICATIONS

Notification of Transmittal of the International Search Report and the Written Opinion of the International Searching Authority, or the Declaration, in corresponding PCT Application No. PCT/US2020/015288 (Apr. 27, 2020).

* cited by examiner

MULTI-BAND BASE STATION ANTENNAS HAVING INTERLEAVED ARRAYS

CROSS-REFERENCE TO RELATED APPLICATIONS

The present application is a 35 U.S.C. § 371 national stage application of PCT International Application No. PCT/US2020/015288, filed Jan. 28, 2020, which itself claims priority to U.S. Provisional Patent Application No. 62/800,133, filed Feb. 1, 2019, the entire content of each of which is incorporated herein by reference.

FIELD

The present disclosure relates to communication systems and, in particular, to multi-band base station antennas.

BACKGROUND

Base station antennas for wireless communication systems are used to transmit Radio Frequency ("RF") signals to, and receive RF signals from, fixed and mobile users of a cellular communications service. Base station antennas often include a linear array or a two-dimensional array of radiating elements, such as dipole, or crossed dipole, radiating elements.

Example base station antennas are discussed in International Publication No. WO 2017/165512 to Bisiules and U.S. patent application Ser. No. 15/921,694 to Bisiules et al., the disclosures of which are hereby incorporated herein by reference in their entireties. Though it may be advantageous to incorporate multiple arrays of radiating elements in a single base station antenna, wind loading and other considerations often limit the number of arrays of radiating elements that can be included in a base station antenna.

SUMMARY

A base station antenna, according to some embodiments herein, may include first and second vertical columns of low-band radiating elements configured to transmit RF signals in a first frequency band. Moreover, the base station antenna may include eight vertical columns of high-band radiating elements configured to transmit RF signals in a second frequency band that is higher than the first frequency band. A first vertical column among the eight vertical columns of high-band radiating elements may be between the first and second vertical columns of low-band radiating elements. A second vertical column among the eight vertical columns of high-band radiating elements may include fewer high-band radiating elements than the first vertical column of high-band radiating elements.

In some embodiments, the first and second vertical columns of high-band radiating elements may be inner and outer columns, respectively. Feed points of the outer column of high-band radiating elements may be aligned in a vertical direction with feed points of the second vertical column of low-band radiating elements. Additionally or alternatively, the outer column of high-band radiating elements may be a first outer column of high-band radiating elements, a third vertical column among the eight vertical columns of high-band radiating elements may be a second outer column of high-band radiating elements, and the first and second vertical columns of low-band radiating elements may be first and second outer columns, respectively, of low-band radiating elements. Moreover, the first and second outer columns of low-band radiating elements may be between the first and second outer columns of high-band radiating elements.

According to some embodiments, feed points of the first vertical column of high-band radiating elements may be staggered relative to feed points of the second vertical column of high-band radiating elements. Additionally or alternatively, the base station antenna may include a feeding board having the first and second vertical columns of low-band radiating elements and the first and second vertical columns of high-band radiating elements mounted thereon.

In some embodiments, a third vertical column among the eight vertical columns of high-band radiating elements may be between the first and second vertical columns of low-band radiating elements. Feed points of the first vertical column of high-band radiating elements may be horizontally spaced apart from feed points of the third vertical column of high-band radiating elements by a first distance. Moreover, feed points of the first vertical column of low-band radiating elements may be horizontally spaced apart from feed points of the second vertical column of low-band radiating elements by a second distance that is substantially an integer multiple of the first distance.

According to some embodiments, feed points of the first vertical column of high-band radiating elements may be vertically spaced apart from each other by a first distance. Feed points of the second vertical column of low-band radiating elements may be vertically spaced apart from each other by a second distance that is substantially an integer multiple of the first distance. Moreover, the second vertical column of high-band radiating elements may include consecutive first, second, and third feed points, the first and second feed points may be vertically spaced apart from each other by the first distance, and the second and third feed points may be vertically spaced apart from each other by a third distance that is longer than the first distance and shorter than the second distance.

A base station antenna, according to some embodiments herein, may include a vertical column of low-band radiating elements configured to transmit RF signals in a first frequency band. Moreover, the base station antenna may include first, second, and third vertical columns of high-band radiating elements configured to transmit RF signals in a second frequency band that is higher than the first frequency band. The vertical column of low-band radiating elements may be between the first and second vertical columns of high-band radiating elements. The third vertical column of high-band radiating elements may include fewer high-band radiating elements than the first vertical column of high-band radiating elements.

In some embodiments, feed points of the third vertical column of high-band radiating elements may be aligned in a vertical direction with feed points of the vertical column of low-band radiating elements. Additionally or alternatively, the vertical column of low-band radiating elements may include a first vertical column of low-band radiating elements, and the base station antenna may include a second vertical column of low-band radiating elements that is between the first and second vertical columns of high-band radiating elements. Moreover, the first and second vertical columns of low-band radiating elements may be first and second outer columns, respectively, of low-band radiating elements. The first and second vertical columns of high-band radiating elements may be first and second outer columns, respectively, of high-band radiating elements.

According to some embodiments, the first and second vertical columns of high-band radiating elements may be first and second outer columns, respectively, of high-band radiating elements. Moreover, the vertical column of low-band radiating elements may be centered between the first and second outer columns of high-band radiating elements.

In some embodiments, the first and second vertical columns of high-band radiating elements may be first and second outer columns, respectively, of high-band radiating elements. Moreover, the vertical column of low-band radiating elements may be offset from a center between the first and second outer columns of high-band radiating elements.

According to some embodiments, the base station antenna may include a feeding board having the low-band radiating elements and the high-band radiating elements mounted on a surface thereof. Moreover, a dipole arm of one of the low-band radiating elements may overlap one of the high-band radiating elements in a direction that is perpendicular to the surface of the feeding board.

A base station antenna, according to some embodiments herein, may include one or more vertical columns of low-band radiating elements configured to transmit RF signals in a first frequency band. Moreover, the base station antenna may include five or more vertical columns of high-band radiating elements configured to transmit RF signals in a second frequency band that is higher than the first frequency band. The five or more vertical columns of high-band radiating elements may extend in parallel with the one or more vertical columns of low-band radiating elements in a vertical direction.

In some embodiments, consecutive first, second, and third vertical columns among the five or more vertical columns of high-band radiating elements may be non-staggered relative to each other. Additionally or alternatively, the station antenna may include a feeding board including the low-band radiating elements and the high-band radiating elements on a surface thereof. A dipole arm of one of the low-band radiating elements may overlap one of the high-band radiating elements in a direction that is perpendicular to the surface of the feeding board.

According to some embodiments, the five or more vertical columns of high-band radiating elements may include at least eight vertical columns of high-band radiating elements. Additionally or alternatively, first and second vertical columns among the five or more vertical columns of high-band radiating elements may include different first and second quantities, respectively, of high-band radiating elements.

In some embodiments, the one or more vertical columns of low-band radiating elements may include first and second vertical columns of low-band radiating elements, and feed points of the first vertical column of low-band radiating elements may be spaced apart from feed points of the second vertical column of low-band radiating elements in a horizontal direction by a distance of about 280 millimeters or less. Moreover, the distance may be a first distance, and feed points of a first vertical column among the five or more vertical columns of high-band radiating elements may be spaced apart from feed points of a consecutive second vertical column among the five or more vertical columns of high-band radiating elements in the horizontal direction by a second distance. The first distance may be substantially an integer multiple of the second distance. The feed points of the first vertical column among the five or more vertical columns of high-band radiating elements may be spaced apart from each other in the vertical direction by a third distance. The feed points of the second vertical column of low-band radiating elements may be spaced apart from each other in the vertical direction by a fourth distance that is substantially an integer multiple of the third distance.

DETAILED DESCRIPTION

Figure 1:
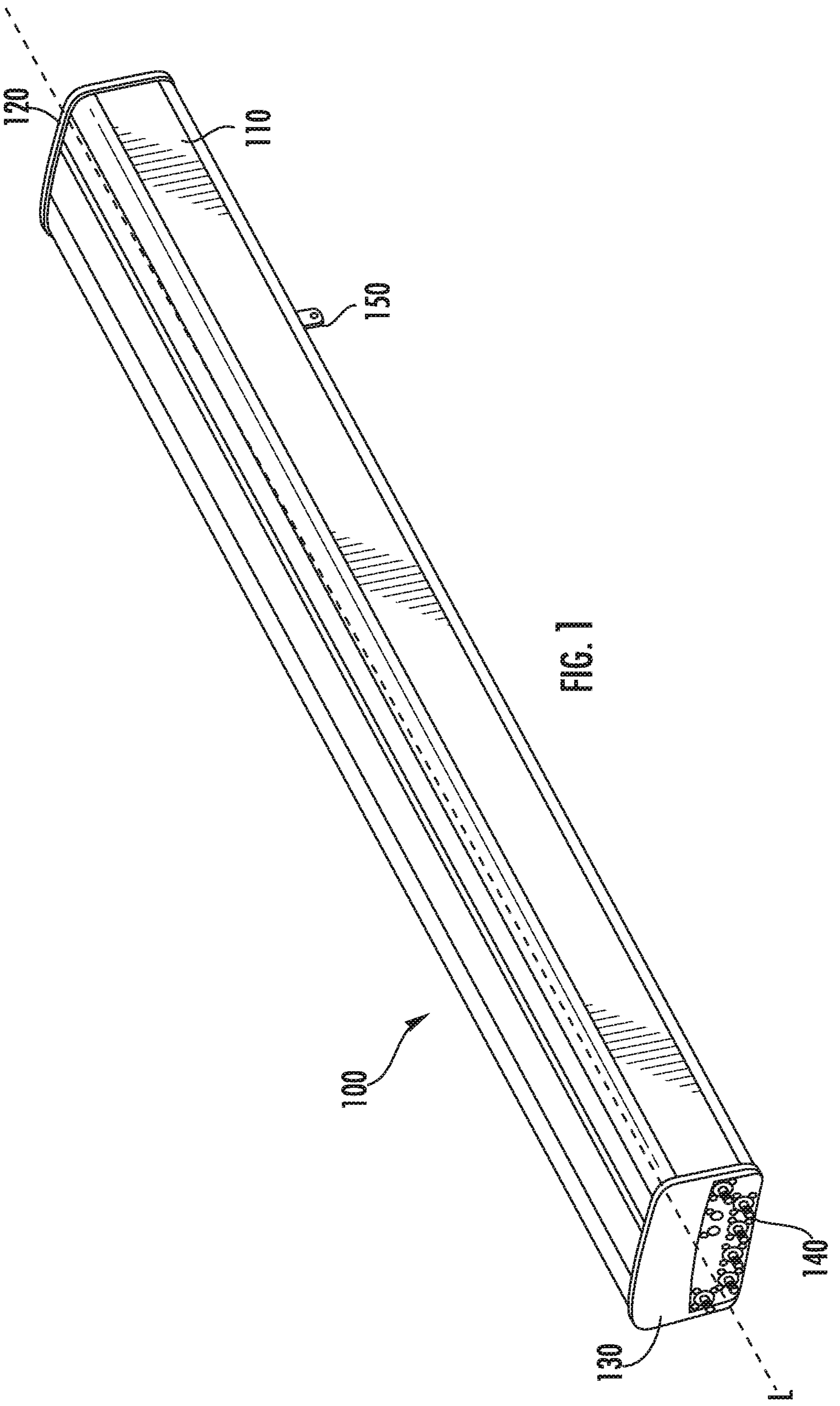
FIG. 1 is a front perspective view of a base station antenna according to embodiments of the present inventive concepts.

Pursuant to embodiments of the present inventive concepts, base station antennas for wireless communication networks are provided. The enhanced-capacity capability of massive MIMO techniques for wireless communication networks makes it desirable to deploy massive MIMO antenna arrays into the existing wireless infrastructure. Frequency bands often considered for massive MIMO operation are in the 2490-2690 megahertz (MHz) and 3300-3800 MHz frequency bands. Yet wireless service providers are faced with the challenge of adding additional antennas and radio heads onto existing towers to provide massive MIMO service in these frequency bands. Some of the challenges may include the lack of availability of mounting space for an additional base station antenna array or the additional wind loading that these base station antenna arrays would add to an existing tower. Because massive MIMO antenna arrays often comprise a large number of antenna elements, often 64 to 256 elements, these arrays can be quite large in size. Additionally, wireless service providers may incur additional lease charges from tower or building owners when adding an additional base station antenna array. Moreover, in many markets, municipal zoning restrictions limit the quantity or height of base station antennas, thus limiting the ability to add massive MIMO base station antenna arrays to provide enhanced-capacity capability.

It may therefore be advantageous to integrate massive MIMO antenna capability in upper frequency bands into multi-band base station antennas. Existing base station antennas often have arrays of antenna elements covering multiple wireless bands from 694 to 2690 MHz. These arrays are often configured as multiple vertical columns of radiating elements, with each radiating element having dual-polarization capability to support MIMO operation in configurations up to 4T4R for 4G LTE.

To keep the overall size of a base station antenna as small as possible, cloaking techniques have been developed that allow low-band radiating elements operating in the 694 to 960 MHz range to appear electromagnetically transparent to mid-band radiating elements operating in the 1427-2690 MHz range. This allows some radiating elements of mid-band arrays to be placed behind (e.g., lower/underneath) the low-band radiating elements, thereby enabling a reduction in the overall size of the multi-band base station antenna.

A similar size optimization can be implemented in the integration of a 3.5 gigahertz (GHz) massive MIMO array into a multi-band base station antenna. The columns of low-band radiating elements are typically spaced by a distance of about 280 millimeters (mm) or less at their feed points (i.e., center-to-center spacing) due to the relatively large physical size of the low-band radiating elements. In light of the relatively large spacing between the low-band columns, it is possible to position an 8T8R high-band array of four columns of dual-polarized radiating elements between two low-band columns of radiating elements. The separation distance between the columns of the 3.5 GHz array may be in the range of about 39 mm to 40 mm, and the total width of the four-column high-band array may thus be about 160 mm, which may allow this high-band array to fit between the two low-band columns.

Various massive MIMO array configurations can provide significant performance improvement. For example, an 8T8R array can provide about 13% more capacity into a sector than a 4T4R array. An 16T16R array can provide about 82% more capacity into a sector than a 4T4R array. Though these comparisons depend upon multiple conditions and assumptions and are therefore variable, a 16T16R array can generally be expected to provide significantly higher capacity than an 8T8R array and therefore will likely be more desirable. Yet the eight columns of dual-polarized radiating elements at 3.5 GHz are horizontally spaced apart by about 280 mm between feed points of outer columns, thus inhibiting a 16T16R high-band array from fitting entirely between a low-band array having a horizontal feed-point spacing of about 280 mm within a multi-band base station antenna.

According to embodiments of the present inventive concepts, however, high-band and low-band arrays may be interleaved with each other. For example, a small percentage (e.g., 10% or fewer) of the radiating elements of the high-band array may be omitted/removed to provide space for the low-band radiating elements. As an example, a base station antenna may include one or more columns of low-band radiating elements interspersed with five or more (staggered or non-staggered) columns of high-band radiating elements, with one or more high-band columns having fewer high-band radiating elements than other high-band columns. Additionally or alternatively, (a) vertical and horizontal element spacings in both arrays may have common multiples, (b) the low-band radiating elements may be in locations that are electromagnetically transparent at high-band frequencies, and/or (c) the high-band radiating elements may be positioned behind the low-band radiating elements.

In some embodiments, a high-band array has eight columns of dual-polarized radiating elements, with twelve dual-polarized radiating elements in each column. Adjacent (i.e., consecutive) ones of the eight columns may be separated by 40 mm, and the outer first and eighth columns thus may be separated by 280 mm from center-to-center. The vertical spacing between high-band radiating elements may be 66 mm. The low-band array may have two columns of low-band radiating elements separated by 280 mm from center-to-center, and the vertical spacing between these elements may be 264 mm. By omitting/removing some non-adjacent (i.e., non-consecutive) elements in the outer columns of the high-band array and replacing these with low-band radiating elements that are part of the low-band array, the pattern and massive MIMO characteristics of the high-band array can be maintained with negligible impact. For example, the first, fifth, and ninth radiating elements of the outer left high-band column, and the fourth, eighth, and twelfth radiating elements of the outer right high-band column may be omitted/removed. As this is a staggered high-band array, the vertical element spacing may be 66 mm, which allows adequate space for replacement of these omitted/removed high-band radiating elements with low-band radiating elements.

The insertion of the low-band radiating elements at the locations of the omitted/removed high-band radiating elements provides an interleaved low-band and high-band array, which may be a sub-section of a larger low-band array. The entire low-band array may have two columns having ten radiating elements in each column. The high-band array may be interleaved among the eight lower radiating elements of the low-band array. Interleaving the high-band array with the low-band array by setting the vertical and horizontal spacings of the radiating elements of both arrays to have common multiples, omitting/removing a small percentage of the high-band array radiating elements, placing low-band radiating elements in locations that are electromagnetically transparent at high-band frequencies, and/or positioning the high-band radiating elements behind the low-band radiating elements may allow the high-band array to be implemented within the envelope of the low-band array, thereby avoiding the need to implement the high-band array as a separate base station antenna. This meets the objective of enabling massive MIMO operation in high-bands using larger MIMO orders, such as 16T16R, without requiring installation of additional base station antennas on base station towers.

Example embodiments of the present inventive concepts will be described in greater detail with reference to the attached figures.

FIG. 1 is a front perspective view of a base station antenna 100 according to embodiments of the present inventive concepts. As shown in FIG. 1, the base station antenna 100 is an elongated structure and has a generally rectangular shape. In some embodiments, the width and depth of the base station antenna 100 may be fixed, and the length of the base station antenna 100 may be variable. For example, the base station antenna 100 may have a width of 400 mm, a depth of 208 mm, and a variable length (meaning that the base station antenna 100 can be ordered in different lengths).

The base station antenna 100 includes a radome 110. In some embodiments, the base station antenna 100 further includes a top end cap 120 and/or a bottom end cap 130. For example, the radome 110, in combination with the top end cap 120, may comprise a single unit, which may be helpful for waterproofing the base station antenna 100. The bottom end cap 130 is usually a separate piece and may include a plurality of connectors 140 mounted therein.

In some embodiments, mounting brackets 150 may be provided on the rear (i.e., back) side of the radome 110. The mounting brackets 150 may be used to mount the base station antenna 100 onto an antenna mount that is on, for example, an antenna tower. The base station antenna 100 is typically mounted in a vertical configuration (i.e., the long side of the base station antenna 100 extends along a vertical axis L with respect to Earth).

Figure 2A:
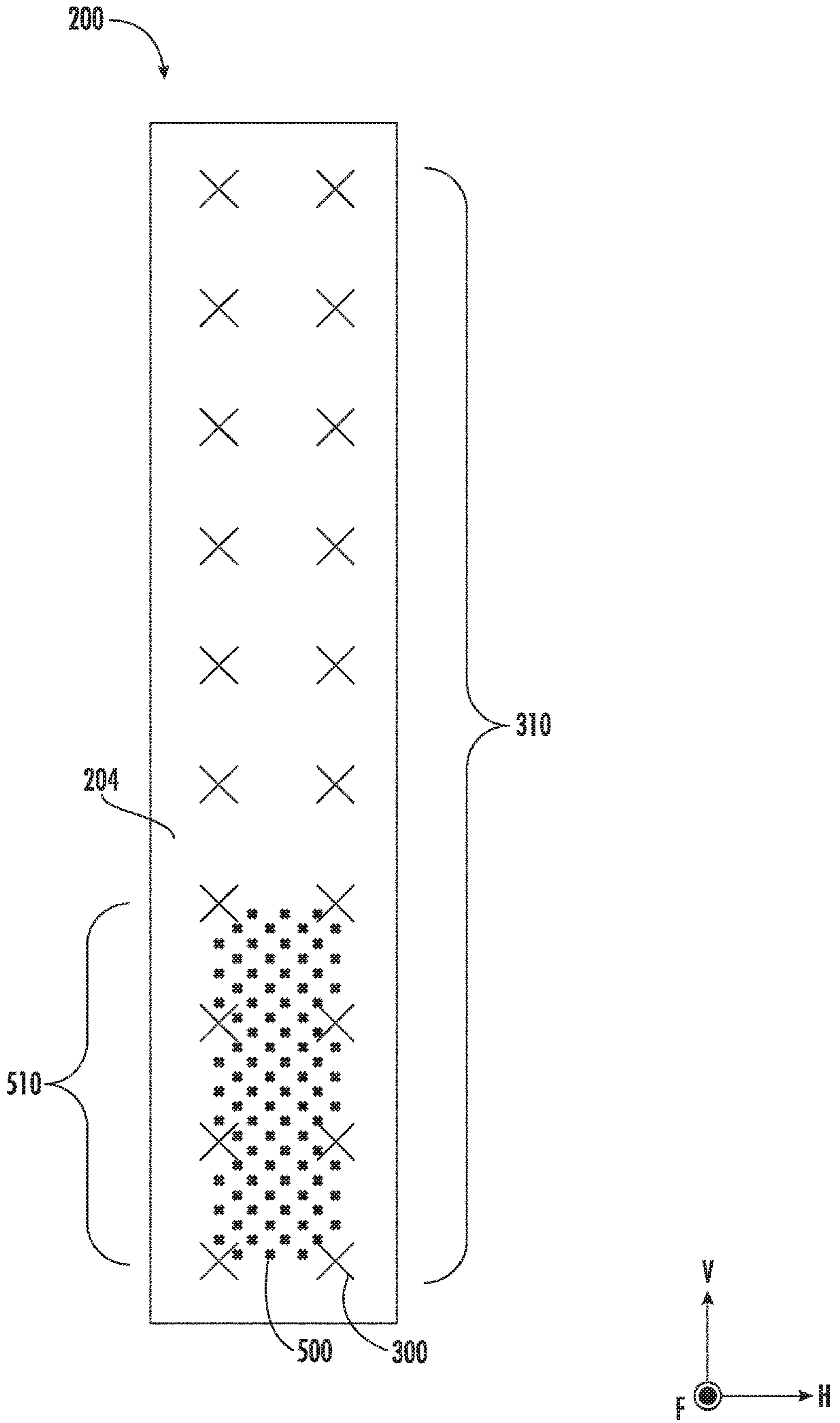
FIG. 2A is a schematic front view of thy: base station antenna of FIG. 1 with the radome removed.

FIG. 2A is a schematic front view of the base station antenna 100 of FIG. 1 with the radome 110 thereof removed to illustrate an antenna assembly 200 of the antenna 100. The antenna assembly 200 includes a plurality of low-band radiating elements 300 and a plurality of high-band radiating elements 500. As a group, the low-band radiating elements 300 may be a low-band array 310. The two columns of low-band radiating elements 300 included in the low-band array 310 may be connected to a single radio to support 4T4R MIMO in the low band, or may be connected to multiple radios (e.g., to support service in both the 700 MHz and 800 MHz frequency bands). Similarly, the high-band radiating elements 500 may, as a group, be a high-band array 510. For example, the high-band array 510 may be an 818R, 116T16R, 32132R, 64T64R, 128T128R or higher array of the high-band radiating elements 500.

The low-band array 310 may extend in a vertical direction V from a lower portion of the antenna assembly 200 to an upper portion of the antenna assembly 200. The high-band array 510, by contrast, may be on the lower portion of the antenna assembly 200 and absent from the upper portion of the antenna assembly 200. For example, the high-band array 510 may be on only the lower 40% of the antenna assembly 200. In some cases, a second high-band array 510 may be added at the upper portion of the antenna assembly 200. Moreover, column spacing in the antenna assembly 200 may be common or overlapping.

The vertical direction V may be, or may be in parallel with, the longitudinal axis L (FIG. 1). The vertical direction V may also be perpendicular to a horizontal direction H and a forward direction F. The low-band radiating elements 300 and the high-band radiating elements 500 may extend forward in the forward direction F from one or more feeding boards 204. For example, the low-band radiating elements 300 and the high-band radiating elements 500 may, in some embodiments, be on the same feeding board 204. As an example, the feeding board 204 may be a single printed circuit board (PCB) having the entire high-band array 510 and at least some of the low-band radiating elements 300 thereon.

Figure 2B:
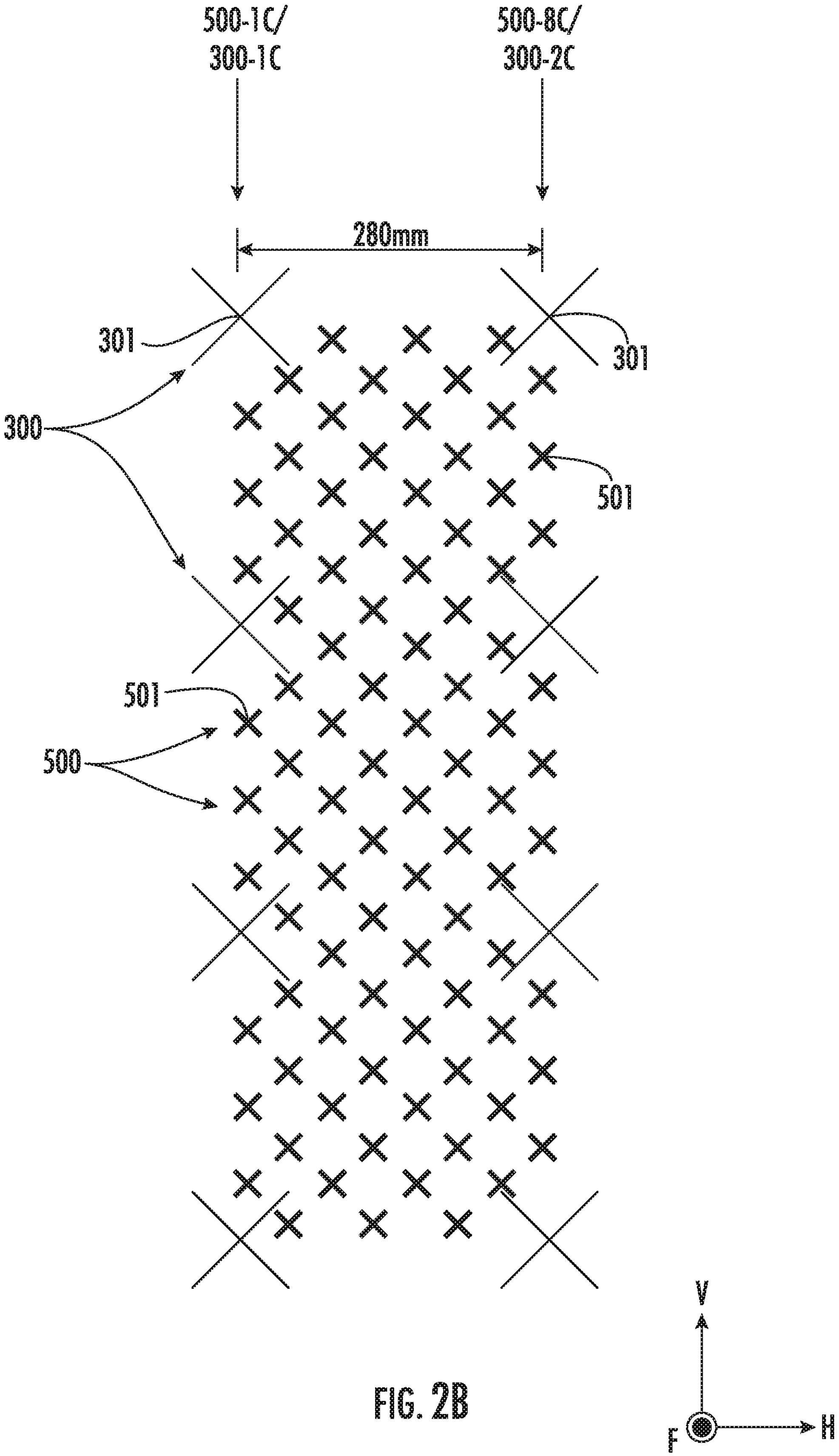
FIG. 2B is an enlarged schematic front view of high-band and low-band radiating elements of FIG. 2A.

FIG. 2B is an enlarged schematic front view of the high-band radiating elements 500 and some of the low-band radiating elements 300 of FIG. 2A. In particular, FIG. 2B is an enlarged view of the lower portion of the antenna assembly 200 that includes the high-band array 510 of FIG. 2A. As shown in FIG. 2B, the high-band array 510 may include eight vertical columns of the high-band radiating elements 500. Feed points 501 of a left outer (e.g., first) vertical column 500-1C of the high-band radiating elements 500 may be spaced apart from feed points 501 of a right outer (e.g., eighth) vertical column 500-8C of the high-band radiating elements 500 in the horizontal direction H by about 280 mm.

As used herein, the term "outer column" (or "outer vertical column") refers to a column that is not between, in the horizontal direction H, adjacent columns of that column type (e.g., high-band or low-band). The term "inner column" (or "inner vertical column"), by contrast, refers to a column that is between, in the horizontal direction H, adjacent columns of that column type. Also, the term "feed point" may refer to the center point of a radiating element.

The feed points 501 of the first vertical column 500-1C of high-band radiating elements 500 may be aligned (or substantially aligned) in the vertical direction V with feed points 301 of a first outer vertical column 300-1C of low-band radiating elements 300. Similarly, the feed points 501 of the eighth vertical column 500-8C of high-band radiating elements 500 may be aligned (or substantially aligned) in the vertical direction V with feed points 301 of a second outer vertical column 300-2C of low-band radiating elements 300. Accordingly, the feed points 301 of the first outer vertical column 300-1C of low-band radiating elements 300 may be spaced apart from the feed points 301 of the second outer vertical column 300-2C of low-band radiating elements 300 in the horizontal direction H by the same non-zero distance as the feed points 501 of the first and eighth vertical columns 500-1C and 500-8C of high-band radiating elements 500, such as by about 280 mm in the example embodiment of FIG. 2B.

Inner ones (i.e., six) of the eight vertical columns 500-1C through 500-8C of high-band radiating elements 500 may be between the feed points 301 of the first and second outer vertical columns 300-1C and 300-2C of low-band radiating elements 300 in the horizontal direction H. The outer vertical columns 500-1C, 500-8C may each include fewer high-band radiating elements 500 than the inner vertical columns 500-2C through 500-7C. For example, at least one of the outer vertical columns 500-1C, 500-8C may comprise a reduction of one, two, three or more high-band radiating elements 500 relative to at least one of the inner vertical columns 500-2C through 500-7C. As an example, the inner vertical columns 500-2C through 500-7C may each comprise twelve high-band radiating elements 500, and the outer vertical columns 500-1C, 500-8C may each comprise nine high-band radiating elements 500. Though twelve and nine are given as examples, the number of high-band radiating elements 500 in a vertical column can be any quantity from two to twenty or more.

By including fewer high-band radiating elements 500 in the outer vertical columns 500-1C, 500-8C, the high-band radiating elements 500 can be more efficiently integrated alongside the low-band radiating elements 300. For example, the space that is made available by including fewer high-band radiating elements 500 in the outer vertical columns 500-1C, 500-8C can be occupied by the low-band radiating elements 300, thus allowing the feed points 301 of the low-band radiating elements 300 to be aligned in the vertical direction V with the feed points 501 of the high-band radiating elements 500. In some embodiments, the low-band radiating elements 300 may alternate (i.e., be interleaved) with groups of the high-band radiating elements 500 in the vertical direction V. As an example, three of the high-band radiating elements 500 may be between each pair of the low-band radiating elements 300 in the vertical direction V.

The low-band radiating elements 300 may be configured to be electromagnetically transparent within the 3300-3800 MHz band, and thus may not significantly impact the radiation or reception behavior of the high-band array 510. Examples of radiating elements that are electromagnetically transparent to a different frequency band from that in which they are configured to transmit are discussed in Chinese Patent Application No. 201810971466.4, the disclosure of which is hereby incorporated herein by reference in its entirety.

One or more techniques for achieving electromagnetic transparency may be used for the low-band radiating elements 300. In some embodiments, a dipole arm 305 (FIG. 2C) of a low-band radiating element 300 that is configured to transmit RF energy in a first frequency band is considered to be "transparent" to RF energy in a second, different (e.g., high) frequency band. For example, each dipole arm 305 may be implemented as a series of widened sections that are connected by intervening narrowed trace sections, so that each dipole arm 305 may act like a low pass filter circuit. Because the dipole arm 305 may be electromagnetically transparent to frequencies of the high-band array 510, the dipole arm 305 may be closer to, or even overlap (in the forward direction F), the high-band array 510. Moreover, this technique for achieving electromagnetic transparency may, in some embodiments, be combined with another technique/type of cloaking/electromagnetic transparency for the low-band radiating elements 300.

Figure 2C:
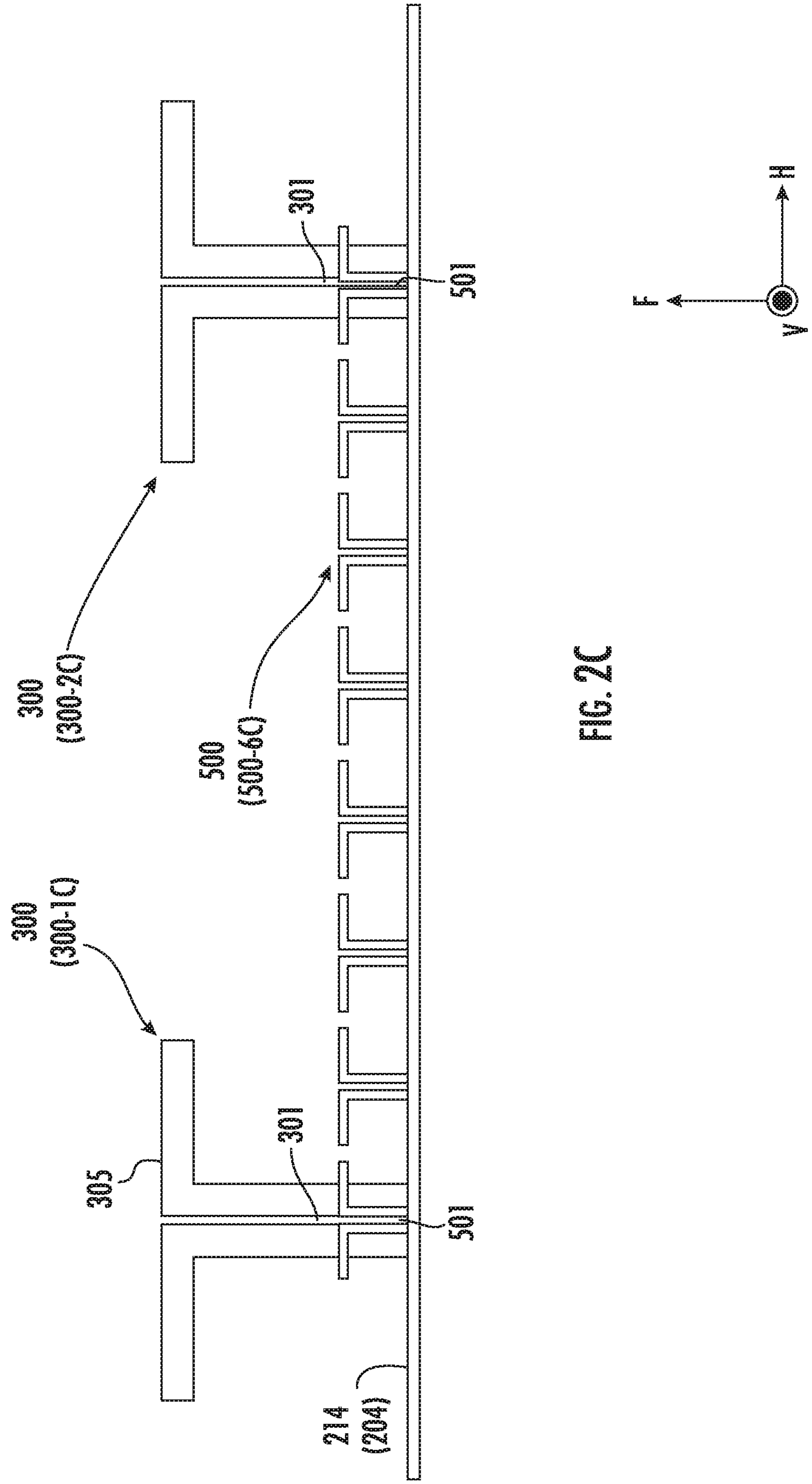
FIG. 2C is a schematic profile view of the high-band and low-band radiating elements of FIG. 2B.

FIG. 2C is a schematic profile view of the high-band radiating elements 500 and the low-band radiating elements 300 of FIG. 2B. The profile view shows a row of the low-band radiating elements 300 along the horizontal direction H. The row includes a low-band radiating element 300 in the first outer vertical column 300-1C and a low-band radiating element 300 in the second outer vertical column 300-2C. The profile view also shows first and second outer ones of the high-band radiating elements 500 that are aligned in the vertical direction V with the first and second outer vertical columns 300-1C and 300-2C, respectively. Moreover, the profile view shows six high-band radiating elements 500 of inner vertical columns, including the sixth vertical column 500-6C, that are between the first and second outer vertical columns 300-1C and 300-2C in the horizontal direction H.

As shown in FIG. 2C, the high-band radiating elements 500 and the low-band radiating elements 300 may extend in the forward direction F from a ground plane reflector 214. The reflector 214 may be a surface of a feeding board 204 (FIG. 2A) that is perpendicular to the forward direction F or may be a metallic sheet that is mounted on the feeding board 204 with cutouts for each radiating element 300, 500. The low-band radiating elements 300 may be sufficiently close to the high-band radiating elements 500 have some overlap therebetween in the forward direction F. For example, a dipole arm 305 of a low-band radiating element 300 in the first outer vertical column 300-1C may overlap a portion of one of the high-band radiating elements 500 in the forward direction F.

Figure 2D:
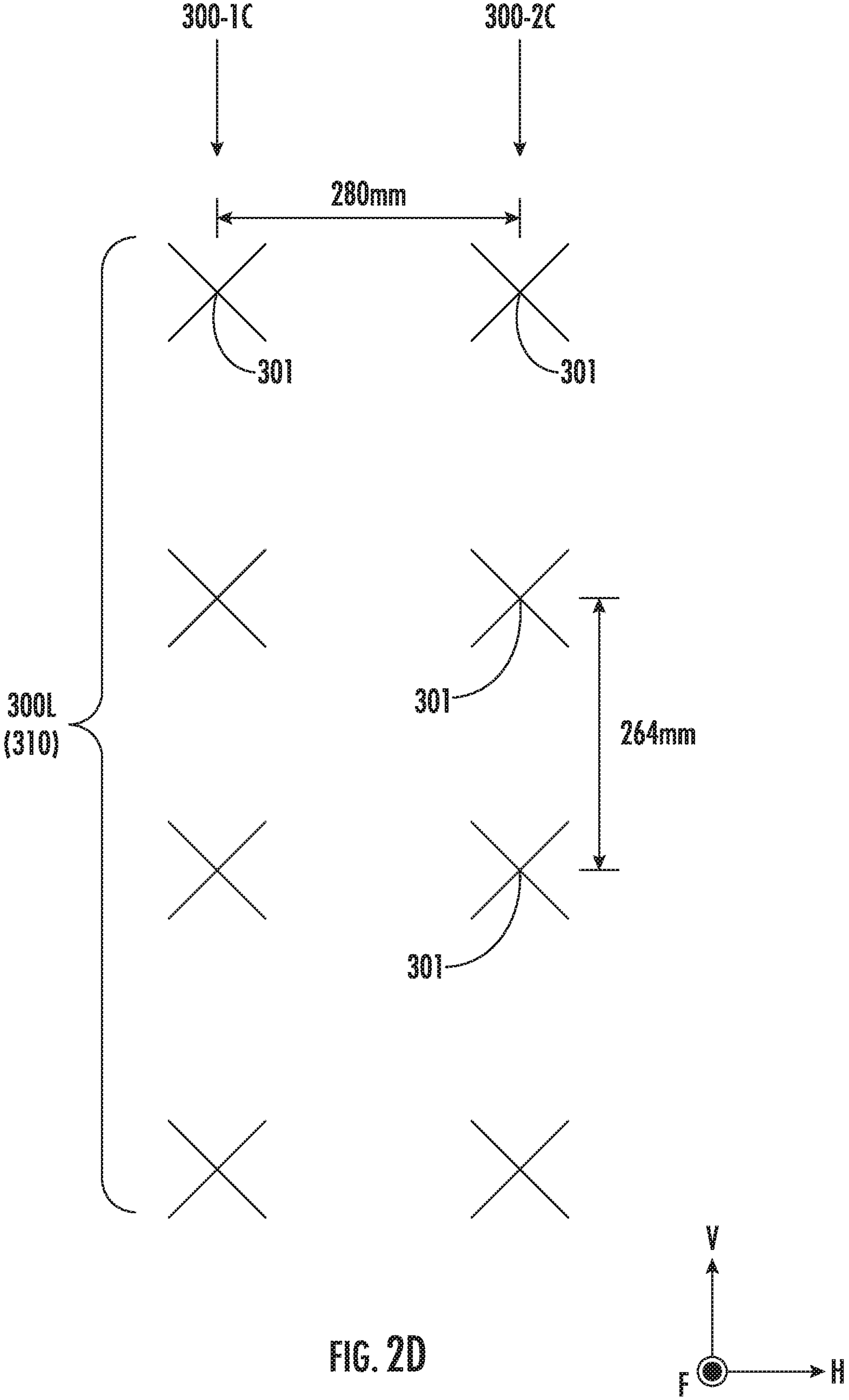
FIG. 2D is a schematic front view of the low-band radiating elements of FIG. 2B with the high-band radiating elements omitted.

FIG. 2D is a schematic front view of the low-band radiating elements 300 of FIG. 2B without the high-band radiating elements 500. For simplicity of illustration, FIG. 2D omits the high-band radiating elements 500 from view and shows only a lower portion 300L of the low-band array 310 (FIG. 2A). As shown in FIG. 2D, a distance in the vertical direction V between respective feed points 301 of consecutive low-band radiating elements 300 in the vertical column 300-2C (or in the vertical column 300-1C) may be about 264 mm, which may be smaller than the distance (e.g., about 280 mm) in the horizontal direction H between a feed point 301 of the vertical column 300-1C and a feed point 301 of the vertical column 300-2C.

Figure 2E:
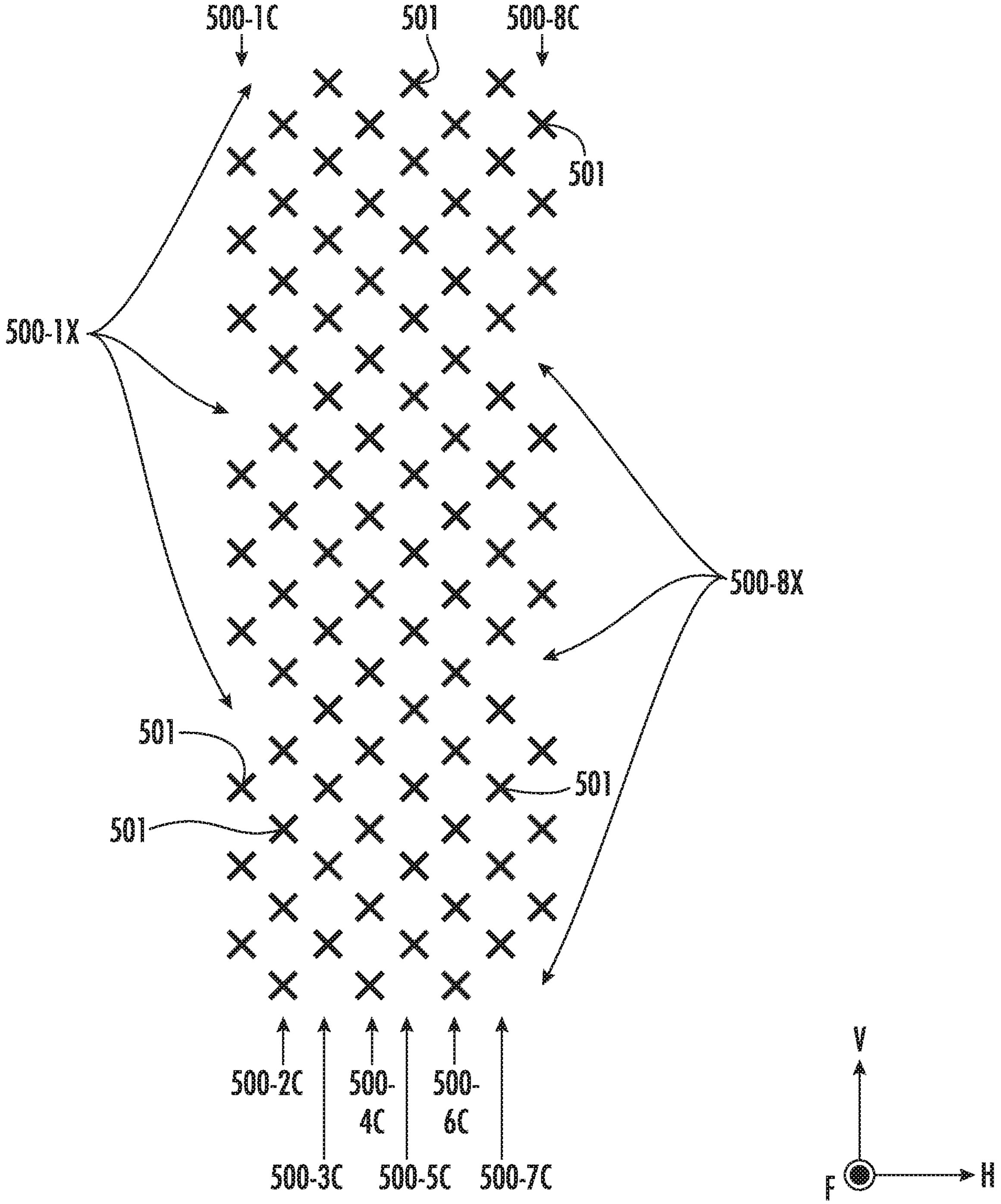
FIG. 2E is a schematic front view of the high-band radiating elements of FIG. 2B with the low-band radiating elements omitted.

FIG. 2E is a schematic front view of the high-band radiating elements 500 of FIG. 2B without the low-band radiating elements 300, which are omitted from view for simplicity of illustration. As shown in FIG. 2E, the outer first and eighth vertical columns 500-1C and 500-8C may each include fewer high-band radiating elements 500 than each of the inner second through seventh vertical columns, 500-2C, 500-3C, 500-4C, 500-5C, 500-6C, and 500-7C. For example, the outer first vertical column 500-1C may include three positions 500-1X where high-band radiating elements 500 are omitted but would otherwise be present if the outer first vertical column 500-1C instead mirrored the inner second through seventh vertical columns, 500-2C, 500-3C, 500-4C, 500-5C, 500-6C, and 500-7C. Similarly, the outer eighth vertical column 500-8C may include three positions 500-8X where high-band radiating elements 500 are omitted.

Though FIG. 2E provides an example with three of the positions 500-1X and three of the positions 500-8X, the outer first vertical column 500-1C may instead include only one or only two of the positions 500-1X and/or the outer eighth vertical column 500-8C may include only one or only two of the positions 500-8X. Moreover, in some embodiments, the outer first vertical column 500-1C may include four or five of the positions 500-1X and/or the outer eighth vertical column 500-8C may include four or five of the positions 500-8X.

Figure 2F:
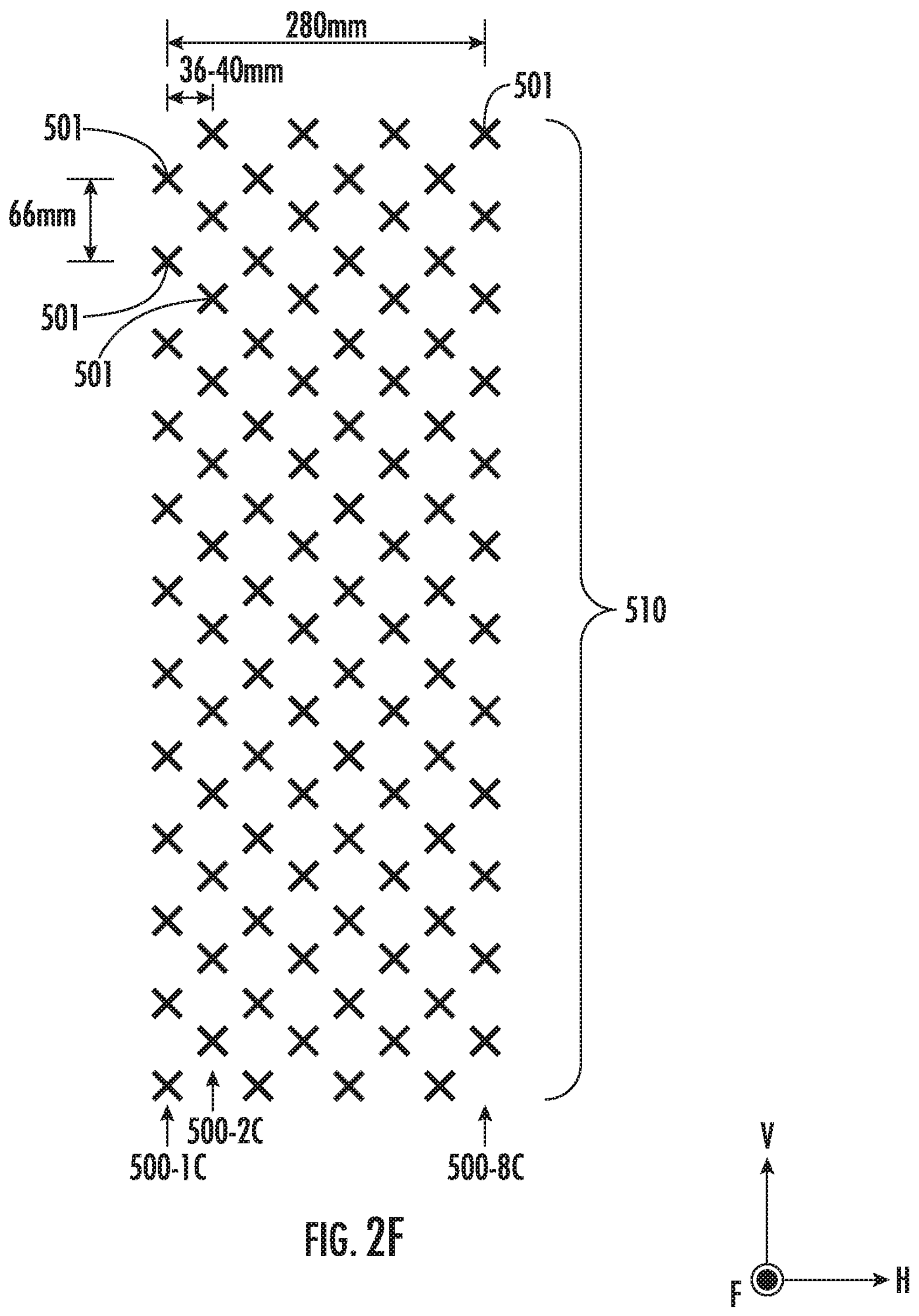
FIG. 2F is a schematic front view of the high-band radiating elements of FIG. 2B with the low-band radiating elements omitted and without removing any of the high-band radiating elements.

FIG. 2F is a schematic front view of the high-band radiating elements 500 of FIG. 2B without the low-band radiating elements 300 and without omitting any of the high-band radiating elements 500 to provide mounting locations for the low-band radiating elements 300. For simplicity of illustration, the low-band radiating elements 300 are omitted from view. As shown in FIG. 2F, a distance in the vertical direction V between respective feed points 501 of consecutive high-band radiating elements 500 in any of the vertical columns 500-1C through 500-8C may be about 66 mm. For comparison, the distance shown in the vertical direction V in FIG. 2D between consecutive feed points 301 may be about an integer multiple (e.g., a multiple of about four) of the distance in the vertical direction V between consecutive feed points 501 in FIG. 2F.

Moreover, a distance in the horizontal direction H between feed points 501 in consecutive columns of the high-band radiating elements 500 may be about 36-40 mm. As an example, a distance between a feed point 501 of the vertical column 500-1C and a feed point of the vertical column 500-2C in the horizontal direction H may be about 39-40 mm. For comparison, the distance shown in the horizontal direction H in FIG. 2D between consecutive feed points 301 may be about an integer multiple (e.g., a multiple of about seven) of the distance in the horizontal direction H between feed points 501 in consecutive ones of the vertical columns 500-1C through 500-8C.

Each of the vertical columns 500-1C through 500-8C shown in FIG. 2F includes the same quantity (e.g., twelve) of high-band radiating elements 500. In some embodiments, the spacing in the vertical direction V may be reduced (i.e., smaller than 66 mm) in one or more of the vertical columns 500-1C through 500-8C to accommodate the low-band radiating elements 300. In particular, the spacing may be reduced as an alternative to reducing the quantity of the high-band radiating elements 500. An example of reduced spacing is shown in FIG. 2J, which is discussed in greater detail later herein.

Alternatively, the spacing shown in FIG. 2F may be implemented throughout each of the inner vertical columns 500-2C through 500-7C and in portions of the outer vertical columns 500-1C and 500-8C, with the exception of the positions 500-1X and 500-8X (FIG. 2E), which may result in a doubling (e.g., to about 132 mm) of the spacing in the vertical direction V across those positions between respective feed points 501 of consecutive high-band radiating elements 500. For example, due to the positions 500-8X, the third and fourth high-band radiating elements 500 from the top of the outer vertical column 500-8C may be spaced apart from each other in the vertical direction V by a distance that is longer than (double) the vertical distance between the second and third high-band radiating elements 500 of the outer vertical column 500-8C and shorter than the vertical distance between consecutive low-band radiating elements 300. As used herein, the term "vertical" (or "vertically") refers to something (e.g., a distance, axis, or column) in the vertical direction V.

FIGS. 2G-2J are enlarged schematic front views of alternative arrangements of the high-band radiating elements 500 and some of the low-band radiating elements 300 of FIG. 2A.

Though FIG. 2A illustrates an example in which no vertical column of the high-band radiating elements 500 extends in the horizontal direction H outside either of the two outer vertical columns 300-1C and 300-2C of the low-band radiating elements 300, one or more vertical columns of the high-band radiating elements 500 may, in some embodiments, do so. For example, FIG. 2G illustrates that the outer first vertical column 500-1C of the high-band radiating elements 500 extends to the left in the horizontal direction H beyond the first outer vertical column 300-1C, and that the outer eighth vertical column 500-8C of the high-band radiating elements 500 extends to the right in the horizontal direction H beyond the second outer vertical column 300-2C.

Figure 2G:
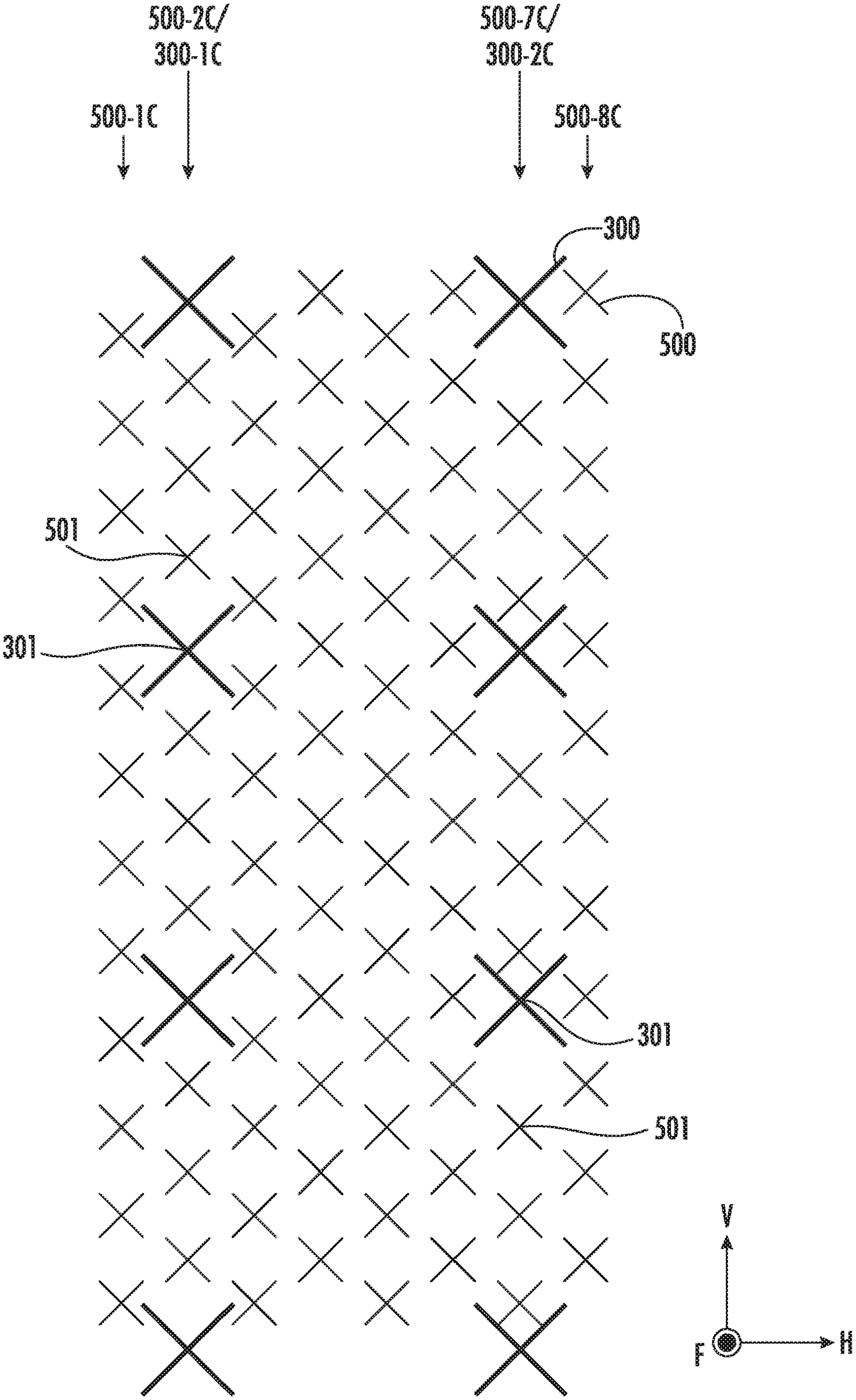
FIGS. 2G-2J are enlarged schematic front views of different arrangements of high-band and low-band radiating elements of FIG. 2A.

Accordingly, as shown in FIG. 2G, the outer first and second outer vertical columns 300-1C and 300-2C may be between the outer first and eighth vertical columns 500-1C and 500-8C. For example, low-band radiating elements 300 of the first and second outer vertical columns 300-1C and 300-2C may be centered on first and second axes, respectively, that extend in the vertical direction V and are between third and fourth vertical axes on which high-band radiating elements 500 of the outer first and eighth vertical columns 500-1C and 500-8C, respectively, are centered.

At least one of the first and second outer vertical columns 300-1C and 300-2C may be offset, in the horizontal direction H, from a center (e.g., a centered vertical axis) between the outer first and eighth vertical columns 500-1C and 500-8C. The vertical columns 300-1C and 300-2C may be staggered relative to each other or may be aligned with each other. In some embodiments, the feed points 301 of the first and second outer vertical columns 300-1C and 300-2C may be aligned in the vertical direction V with feed points 501 of the inner second and seventh vertical columns 500-2C and 500-7C, respectively. The inner second and seventh vertical columns 500-2C and 500-7C may also have fewer high-band radiating elements 500 than the outer first and eighth vertical columns 500-1C and 500-8C. Moreover, irrespective of whether any of the high-band radiating elements 500 extends in the horizontal direction H beyond the low-band radiating elements 300, at least one vertical column of high-band radiating elements 500 may be between, in the horizontal direction H, the two vertical columns 300-1C and 300-2C of the low-band radiating elements 300.

Figure 2H:
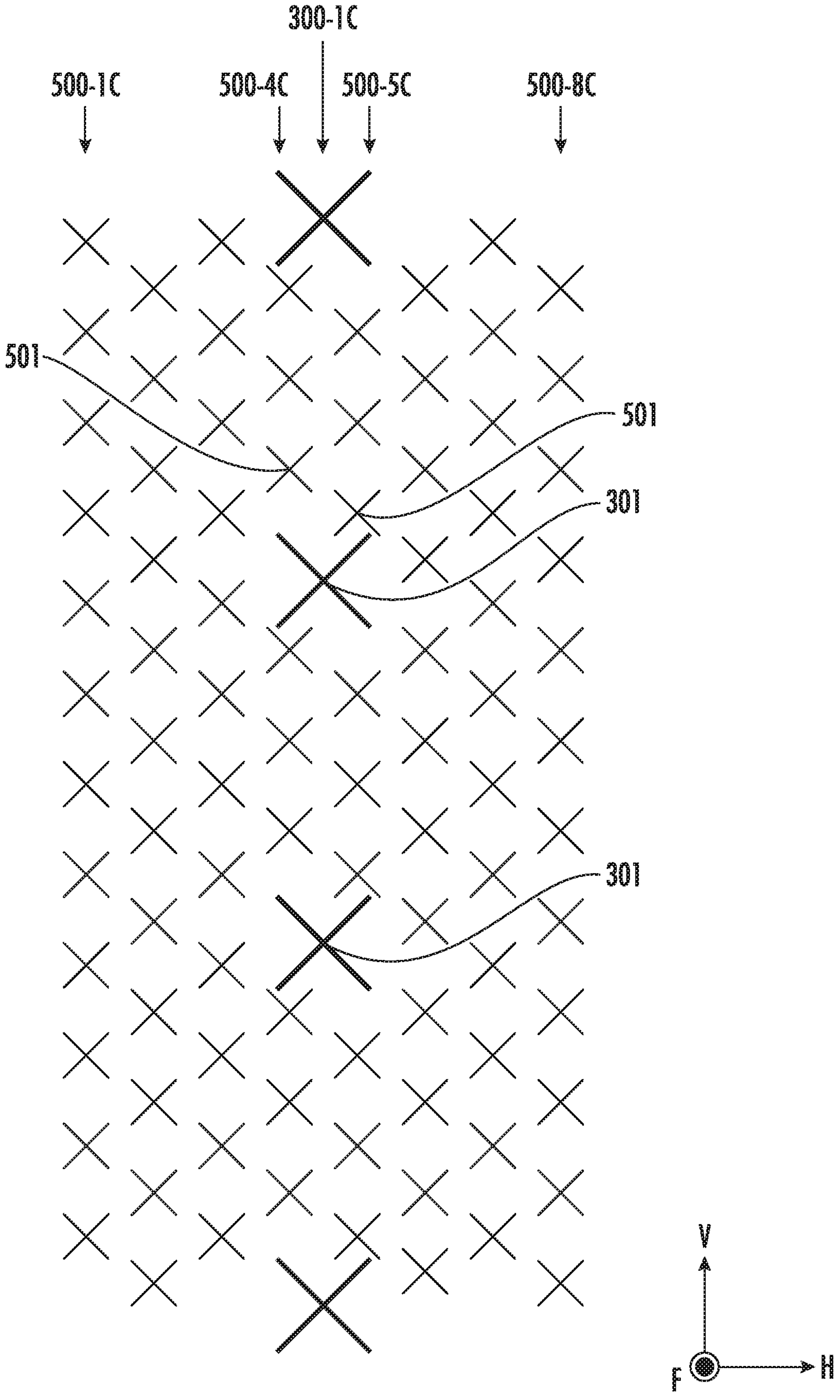

Referring to FIG. 2H, an antenna 100 is not limited to the two vertical columns 300-1C and 300-2C (FIG. 2B) of low-band radiating elements 300. Rather, as shown in FIG. 2H, the second vertical column 300-2C may be omitted from the antenna 100. The first vertical column 300-1C may thus be the only vertical column of the low-band radiating elements 300 in the antenna 100.

FIG. 2H also shows that the vertical column 300-1C may be between the outer first and eighth vertical columns 500-1C and 500-8C. For example, low-band radiating elements 300 of the vertical column 300-1C may be centered on a first axis that extends in the vertical direction V and is between, in the horizontal direction H, second and third vertical axes on which high-band radiating elements 500 of the outer first and eighth vertical columns 500-1C and 500-8C, respectively, are centered. In some embodiments, the vertical column 300-1C may be centered in the horizontal direction H between the outer first and eighth vertical columns 500-1C and 500-8C. As an example, feed points 301 of the vertical column 300-1C may be aligned with each other on a first axis in the vertical direction V between second and third vertical axes on which the inner fourth and fifth vertical columns 500-4C and 500-5C, respectively, comprise feed points 501. To provide space for the vertical column 300-1C, at least one of the inner fourth and fifth vertical columns 500-4C and 500-5C may have fewer high-band radiating elements 500 than others of the vertical columns 500-1C through 500-8C.

Figure 2I:
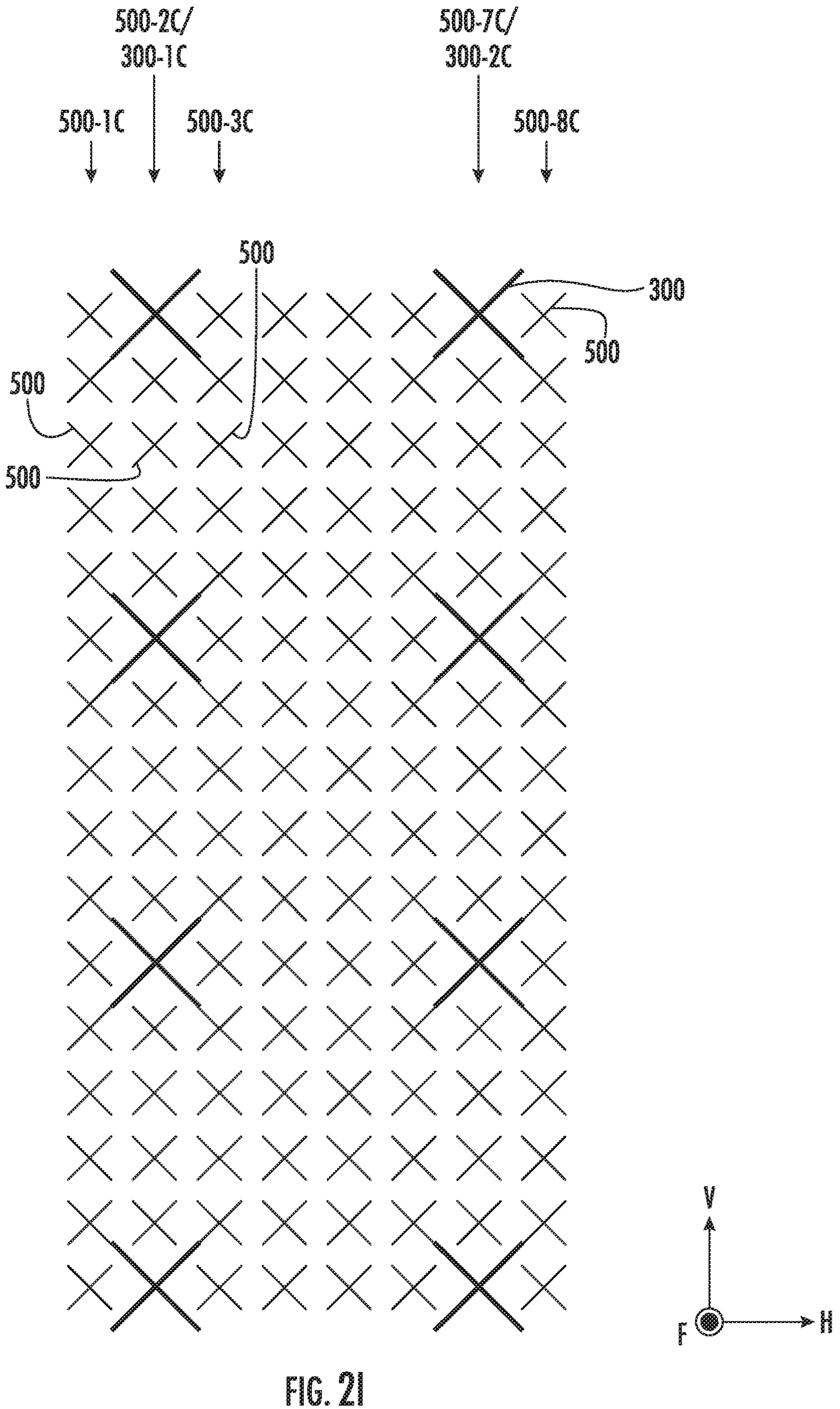
Figure 2J:
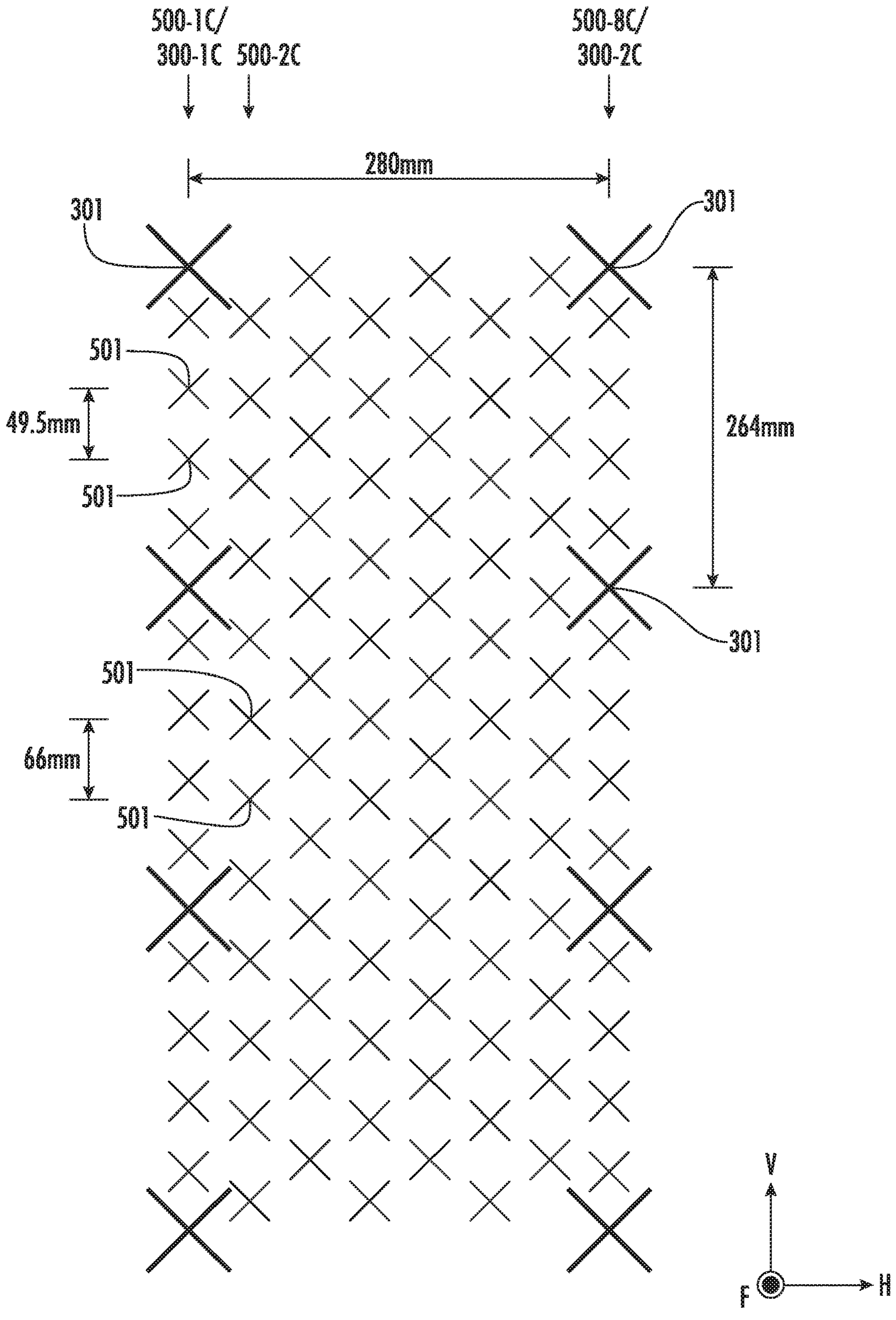

Referring to FIG. 2I, at least two consecutive ones of the vertical columns 500-1C through 500-8C may be non-staggered relative to each other. For example, the consecutive first, second, and third vertical columns 500-1C through 500-3C may comprise respective ones of the high-band radiating elements 500 that are aligned with each other in the horizontal direction H. In some embodiments, an antenna 100 may include five or more of the vertical columns 500-1C through 500-8C, at least two (or at least three) consecutive ones of which may be non-staggered relative to each other. Such a non-staggered arrangement, however, may complicate a feed network of the antenna 100 relative to a staggered arrangement.

The non-staggered arrangement of the high-band radiating elements 500 as shown in FIG. 2I may be referred to herein as a "rectangular array" (or "rectangular grid") and is in contrast with the staggered vertical columns of the high-band radiating elements 500 as shown in FIGS. 2A, 2B, and 2E-2H. For example, FIG. 2E illustrates that high-band radiating elements 500 of the consecutive first and second vertical columns 500-1C and 500-2C are offset from each other in the vertical direction V. Accordingly, though feed points 501 of the first vertical column 500-1C of FIG. 2E may be aligned with feed points 501 of the third, fifth, and seventh vertical columns 500-3C, 500-5C, and 500-7C along the horizontal direction H, they are not aligned along the horizontal direction H with feed points 501 of the neighboring second vertical column 500-2C. The feed points 501 of the first vertical column 500-1C may thus be referred to herein as "staggered" relative to the feed points 501 of the second vertical column 500-2C.

Irrespective of whether they are staggered or non-staggered, five or more vertical columns 500-1C through 500-8C of antenna 100 may extend in parallel with one or more vertical columns 300-1C/300-2C of low-band radiating elements 300 in the vertical direction V. Also, the five or more vertical columns 500-1C through 500-8C may, in some embodiments, comprise at least eight (e.g., 8, 9, 10, 11, 12, 13, 14, 15, or 16) vertical columns of high-band radiating elements 500.

In embodiments in which the five or more of the vertical columns 500-1C through 500-8C are non-staggered, at least one high-band radiating element 500 may be omitted to provide space for a respective low-band radiating element 300. For example, FIG. 2I illustrates an example in which the first and second vertical columns 500-1C and 500-2C have different quantities, respectively, of high-band radiating elements 500. In particular, the second and seventh vertical columns 500-2C and 500-7C have fewer high-band radiating elements 500 than others of the vertical columns 500-1C through 500-8C.

Referring to FIG. 2J, center-to-center vertical spacing between high-band radiating elements 500 may be reduced in one or more vertical columns 500-1C through 500-8C as an alternative to reducing the quantity of high-band radiating elements 500. For example, feed points 501 in the outer vertical column 500-1C (and/or the outer vertical column 500-8C) of the example embodiment of FIG. 2J may be spaced apart from each other by a shorter distance than feed points 501 in the outer vertical columns 500-1C and 500-8C that are shown in the examples of FIGS. 2E and 2F. As an example, feed points 501 within three groups in the outer vertical column 500-1C of FIG. 2J may be spaced apart from each other in the vertical direction V by about 75% (i.e., about 49.5 mm) or less of the corresponding distance (66 mm) that is shown in FIG. 2F. Reducing this vertical spacing provides space to mount low-band radiating elements 300 in alternating arrangement with high-band radiating elements 500 (e.g., after every fourth high-band radiating element 500) in the vertical direction V without omitting/removing any high-band radiating elements 500. Inner vertical columns, such as the vertical column 500-2C, may also have a reduced vertical spacing or may have the same vertical spacing that is shown in FIG. 2F.

Figure 3:
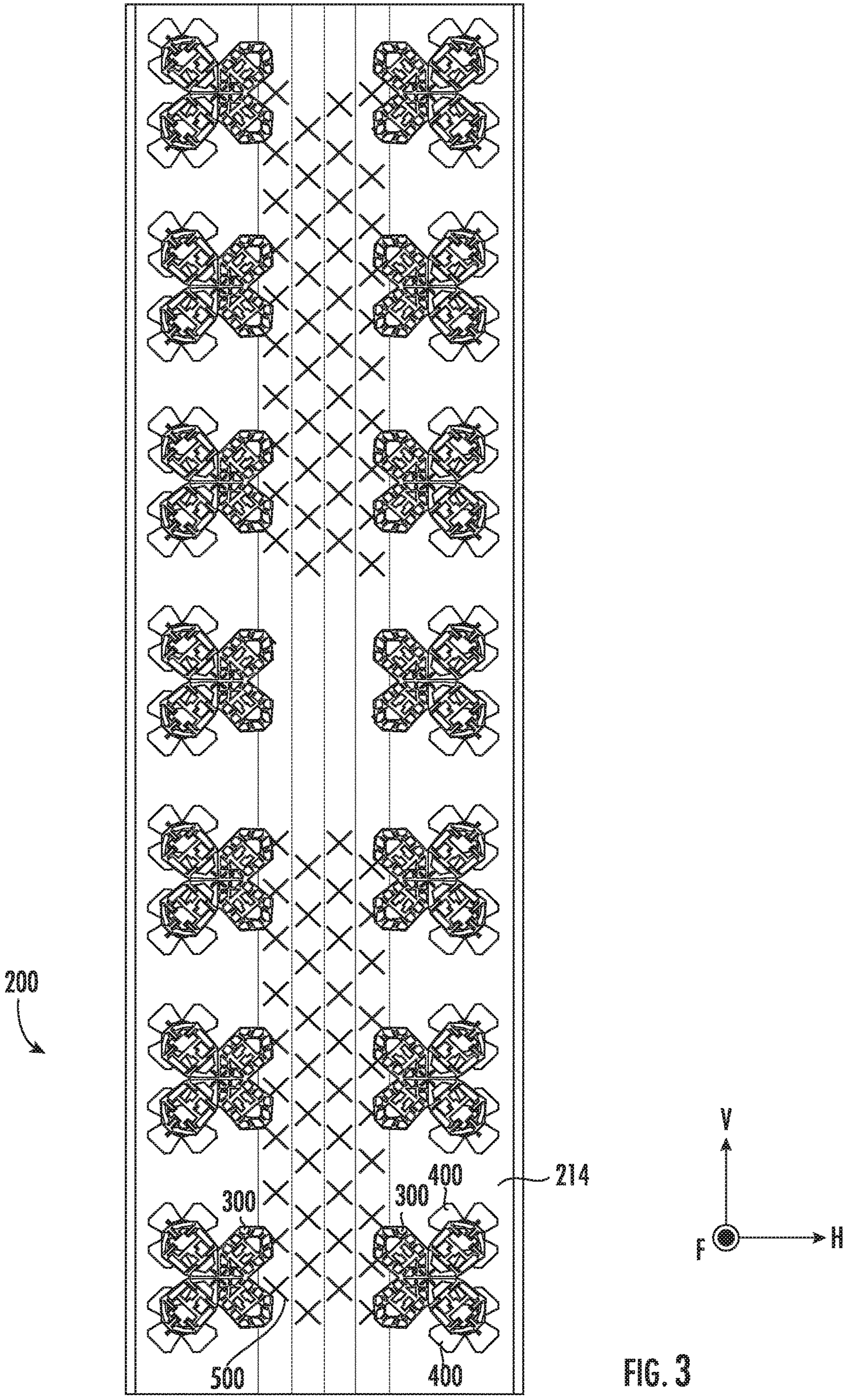
FIG. 3 is a front view of another base station antenna, according to embodiments of the present inventive concepts, with the radome removed.

FIG. 3, which corresponds to FIG. 3 of the Chinese Patent Application No. 201810971466.4 that is discussed with respect to FIG. 2B herein, is a front view of the base station antenna 100 of FIG. 1 with the radome 110 thereof removed to illustrate an antenna assembly 200 of the antenna 100. As shown in FIG. 3, high-band radiating elements 500 and low-band radiating elements 300 may be on a front side of a reflector surface 214 of a ground plane structure. Moreover, mid-band radiating elements 400 may also be on the front side of t reflector surface 214.

For simplicity of illustration, only four vertical columns of the high-band radiating elements 500 are shown in FIG. 3. The low-band radiating elements 300 and/or the mid-band radiating elements 400 shown in FIG. 3, however, may be integrated with five or more of the vertical columns 500-1C through 500-8C of the high-band radiating elements 500 of any of the FIGS. 2A-2C and 2E-2J. For example, the mid-band radiating elements 400 may be implemented in vertical columns that are outside (rather than between or aligned with) the vertical columns 500-1C through 500-8C of the high-band radiating elements 500 of any of FIGS. 2A-2C and 2E-2J. The mid-band radiating elements 400 may also be outside the vertical column 300-1C and/or the vertical column 300-2C of the low-band radiating elements 300. In some embodiments, however, the mid-band radiating elements 400 may be omitted. Moreover, ones of the high-band radiating elements 500 that are shown on the upper portion of the antenna assembly 200 in FIG. 3 may be omitted.

Various mechanical and electronic components of the antenna 100 may be mounted in a chamber behind a back side of the reflector surface 214. The components may include, for example, phase shifters, remote electronic tilt units, mechanical linkages, a controller, diplexers, and the like. The reflector surface 214 may comprise a metallic surface that serves as a reflector and ground plane for the radiating elements 300, 400, 500 of the antenna 100. Herein, the reflector surface 214 may also be referred to as the reflector 214.

The radiating elements 300, 400, 500 may comprise dual-polarized radiating elements that are mounted to extend forwardly in the forward direction F from the reflector surface 214. As shown in FIG. 3, the low-band radiating elements 300 may be mounted in two columns to form two linear arrays of the low-band radiating elements 300. Each low-band linear array may extend along substantially the full length of the antenna 100 in some embodiments. The mid-band radiating elements 400 may likewise be mounted in two columns to form two linear arrays of the mid-band radiating elements 400. In some embodiments, however, only a single linear array of the low-band radiating elements 300 and/or only a single linear array of the mid-band radiating elements 400 may be on the reflector surface 214. Moreover, the high-band radiating elements 500 may be mounted in four or more (or five or more) columns to form four or more (or five or more) linear arrays of the high-band radiating elements 500.

In FIG. 3, the linear arrays of high-band radiating elements 500 are positioned between the linear arrays of low-band radiating elements 300, and each linear array of low-band radiating elements 300 is positioned between a respective one of the linear arrays of high-band radiating elements 500 and a respective one of the linear arrays of mid-band radiating elements 400. The linear arrays of mid-band radiating elements 400 and the linear arrays of high-band radiating elements 500 may or may not extend the full length of the antenna 100. Moreover, in some embodiments, the low-band radiating elements 300 may each have a cloverleaf shape.

The low-band radiating elements 300 may be configured to transmit and receive signals in a frequency band comprising the 694-960 MHz frequency range or a portion thereof. The mid-band radiating elements 400 may be configured to transmit and receive signals in a frequency band comprising the 1427-2690 MHz frequency range or a portion thereof. The high-band radiating elements 500 may be configured to transmit and receive signals in a frequency band comprising the 3300-4200 MHz frequency range or a portion thereof.

The low-band linear arrays may or may not be configured to transmit and receive signals in the same portion of a low frequency band. For example, in some embodiments, the low-band radiating elements 300 in a first linear array may be configured to transmit and receive signals in the 700 MHz frequency band and the low-band radiating elements 300 in a second linear array may be configured to transmit and receive signals in the 800 MHz frequency band. Alternatively, the low-band radiating elements 300 in both the first and second linear arrays may be configured to transmit and receive signals in the 700 MHz (or 800 MHz) frequency band. The mid-band and high-band radiating elements 400, 500 in the different mid-band and high-band linear arrays may similarly have any suitable configuration.

As noted above, the low-band radiating elements 300 may be arranged as two low-band linear arrays of radiating elements. Each linear array may be used to form a pair of antenna beams, namely an antenna for each of the two polarizations at which the dual-polarized radiating elements are designed to transmit and receive RF signals. Each radiating element 300 in the first low-band array may be horizontally aligned in the horizontal direction H with a respective radiating element 300 in the second low-band array. Likewise, each radiating element 400 in the first mid-band array may be horizontally aligned with a respective radiating element 400 in the second mid-band array. In some embodiments, beamforming can be performed using all of the vertical columns 500-1C through 500-8C of the high-band radiating elements 500.

The radiating elements 300, 400, 500 may be mounted on one or more feeding (or "feed") boards 204 (FIG. 2A) that couple RF signals to and from the individual radiating elements 300, 400, 500. For example, all of the radiating elements 300, 400, 500 may be mounted on the same feeding board 204. Cables may be used to connect each feeding board 204 to other components of the antenna 100, such as diplexers, phase shifters, or the like.

The arrangements of the high-band radiating elements 500 and the low-band radiating elements 300 according to embodiments of the present inventive concepts may provide a number of advantages. These advantages include providing space for the low-band radiating elements 300 by eliminating one or more of the high-band radiating elements 500, such as in the positions 500-1X and 500-8X (FIG. 2E). For example, outer high-band columns 500-1C and 500-8C may have fewer high-band radiating elements 500 than inner high-band columns 500-2C through 500-7C, to accommodate the low-band radiating elements 300. Such an integration of the high-band radiating elements 500 alongside the low-band radiating elements 300 may provide enhanced-capacity capability to an antenna 100 while fitting in a compact space.

By eliminating only a small quantity of the high-band radiating elements 500, any impact on the high-band performance of an antenna 100 may not be significantly detrimental. As an example, quantization lobes resulting from the non-uniform spacing of the high-band radiating elements 500 may not be significant. Any loss in gain may also be too small to significantly reduce high-band performance.

As an alternative to eliminating some of the high-band radiating elements 500, spacing between the high-band radiating elements 500 may be decreased to provide room for the low-band radiating elements 300. Such decreased spacing, however, may introduce fit and feeding complications to an antenna 100.

Moreover, configuring the low-band radiating elements 300 to be electromagnetically transparent to frequencies of the high-band radiating elements 500 may help to facilitate the integration of the high-band radiating elements 500 alongside the low-band radiating elements 300. For example, one or more electromagnetic transparency techniques may be used to allow the high-band radiating elements 500 to be positioned behind (in the forward direction F) the low-band radiating elements 300.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A base station antenna comprising:

first and second vertical columns of low-band radiating elements configured to transmit radio frequency ("RF") signals in a first frequency band; and eight vertical columns of high-band radiating elements configured to transmit RF signals in a second frequency band that is higher than the first frequency band, wherein a first vertical column among the eight vertical columns of high-band radiating elements is between the first and second vertical columns of low-band radiating elements and includes only high-band radiating elements, and wherein a second vertical column among the eight vertical columns of high-band radiating elements comprises fewer high-band radiating elements than the first vertical column of high-band radiating elements.

2. The base station antenna of claim 1, wherein the first and second vertical columns of high-band radiating elements are inner and outer columns, respectively.

3. The base station antenna of claim 2, wherein feed points of the outer column of high-band radiating elements are aligned in a vertical direction with feed points of the second vertical column of low-band radiating elements.

4. The base station antenna of claim 2, wherein the outer column of high-band radiating elements is a first outer column of high-band radiating elements, wherein a third vertical column among the eight vertical columns of high-band radiating elements is a second outer column of high-band radiating elements, and wherein the first and second vertical columns of low-band radiating elements are first and second outer columns, respectively, of low-band radiating elements.

5. The base station antenna of claim 4, wherein the first and second outer columns of low-band radiating elements are between the first and second outer columns of high-band radiating elements.

6. The base station antenna of claim 1, wherein feed points of the first vertical column of high-band radiating elements are staggered relative to feed points of the second vertical column of high-band radiating elements.

7. The base station antenna of claim 1, further comprising a feeding board having the first and second vertical columns of low-band radiating elements and the first and second vertical columns of high-band radiating elements mounted thereon.

8. The base station antenna of claim 1, wherein a third vertical column among the eight vertical columns of high-band radiating elements is between the first and second vertical columns of low-band radiating elements, wherein feed points of the first vertical column of high-band radiating elements are horizontally spaced apart from feed points of the third vertical column of high-band radiating elements by a first distance, and wherein feed points of the first vertical column of low-band radiating elements are horizontally spaced apart from feed points of the second vertical column of low-band radiating elements by a second distance that is substantially an integer multiple of the first distance.

9. The base station antenna of claim 1, wherein feed points of the first vertical column of high-band radiating elements are vertically spaced apart from each other by a first distance, and wherein feed points of the second vertical column of low-band radiating elements are vertically spaced apart from each other by a second distance that is substantially an integer multiple of the first distance.

10. The base station antenna of claim 9, wherein the second vertical column of high-band radiating elements comprises consecutive first, second, and third feed points, wherein the first and second feed points are vertically spaced apart from each other by the first distance, and wherein the second and third feed points are vertically spaced apart from each other by a third distance that is longer than the first distance and shorter than the second distance.

11. A base station antenna comprising:

a vertical column of low-band radiating elements configured to transmit radio frequency ("RF") signals in a first frequency band; and first, second, third, fourth, fifth, sixth, seventh and eighth vertical columns of high-band radiating elements configured to transmit RF signals in a second frequency band that is higher than the first frequency band, wherein the vertical column of low-band radiating elements is between the first and second vertical columns of high-band radiating elements, wherein each of the first and second vertical columns of high-band radiating elements includes only high-band radiating elements, and wherein the third vertical column of high-band radiating elements comprises fewer high-band radiating elements than the first vertical column of high-band radiating elements.

12. The base station antenna of claim 11, wherein the first and second vertical columns of high-band radiating elements are first and second outer columns, respectively, of high-band radiating elements, and wherein the vertical column of low-band radiating elements is centered between the first and second outer columns of high-band radiating elements.

13. The base station antenna of claim 11, wherein the first and second vertical columns of high-band radiating elements are first and second outer columns, respectively, of high-band radiating elements, and wherein the vertical column of low-band radiating elements is offset from a center between the first and second outer columns of high-band radiating elements.

14. The base station antenna of claim 11, further comprising a feeding board having the low-band radiating elements and the high-band radiating elements mounted on a surface thereof, wherein a dipole arm of one of the low-band radiating elements overlaps one of the high-band radiating elements in a direction that is perpendicular to the surface of the feeding board.

15. A base station antenna comprising:

one or more vertical columns of low-band radiating elements configured to transmit radio frequency ("RF") signals in a first frequency band; and eight or more vertical columns of high-band radiating elements configured to transmit RF signals in a second frequency band that is higher than the first frequency band, wherein the eight or more vertical columns of high-band radiating elements extend in parallel with the one or more vertical columns of low-band radiating elements in a vertical direction, and wherein first and second vertical columns among the eight or more vertical columns of high-band radiating elements comprise different first and second quantities, respectively, of high-band radiating elements.

16. The base station antenna of claim 15, wherein consecutive first, second, and third vertical columns among the eight or more vertical columns of high-band radiating elements are non-staggered relative to each other.

17. The base station antenna of claim 15, wherein the one or more vertical columns of low-band radiating elements comprise first and second vertical columns of low-band radiating elements, and wherein feed points of the first vertical column of low-band radiating elements are spaced apart from feed points of the second vertical column of low-band radiating elements in a horizontal direction by a distance of about 280 millimeters or less.

18. The base station antenna of claim 17, wherein the distance comprises a first distance, wherein feed points of a first vertical column among the eight or more vertical columns of high-band radiating elements are spaced apart from feed points of a consecutive second vertical column among the eight or more vertical columns of high-band radiating elements in the horizontal direction by a second distance, wherein the first distance is substantially an integer multiple of the second distance, wherein the feed points of the first vertical column among the eight or more vertical columns of high-band radiating elements are spaced apart from each other in the vertical direction by a third distance, and wherein the feed points of the second vertical column of low-band radiating elements are spaced apart from each other in the vertical direction by a fourth distance that is substantially an integer multiple of the third distance.

* * * * *